United States Patent
Mery

Patent Number: 5,168,260
Date of Patent: Dec. 1, 1992

[54] WEAR INDICATOR FOR A FRICTION LINING

[75] Inventor: Jean-Claude Mery, Pavillons-Sous-Bois, France

[73] Assignee: Bendix Europe Services Techniques, Drancy, France

[21] Appl. No.: 691,755

[22] Filed: Apr. 26, 1991

[30] Foreign Application Priority Data

May 31, 1990 [FR] France ................. 90 06774

[51] Int. Cl.⁵ .................................. B60Q 1/00
[52] U.S. Cl. ...................... 340/454; 340/453; 200/61.4; 188/1.11
[58] Field of Search ............ 340/454, 453; 188/1.11; 116/208; 200/61.4

[56] References Cited

U.S. PATENT DOCUMENTS

| | | | |
|---|---|---|---|
| 3,553,642 | 1/1971 | Rike et al. | 340/454 |
| 3,649,959 | 3/1972 | Sakata et al. | 340/454 |
| 4,869,350 | 9/1989 | Fargier et al. | 340/454 X |
| 4,890,697 | 1/1990 | Fischer et al. | 188/1.11 |
| 5,015,990 | 5/1991 | Reede | 340/454 |

FOREIGN PATENT DOCUMENTS

| | | | |
|---|---|---|---|
| 2030961 | 2/1971 | Fed. Rep. of Germany | |
| 2519830 | 11/1976 | Fed. Rep. of Germany | |
| 87100533 | 10/1987 | Fed. Rep. of Germany | |
| 2170712 | 9/1973 | France | |
| 2203466 | 5/1974 | France | |
| 2497309 | 7/1982 | France | |
| 2648528 | 12/1990 | France | 188/1.11 |
| 2194824 | 3/1988 | United Kingdom | 340/454 |

*Primary Examiner*—Jin F. Ng
*Assistant Examiner*—Christine K. Oda
*Attorney, Agent, or Firm*—Larry J. Palguta; Ken C. Decker

[57] ABSTRACT

The wear indicator of the friction lining (10) of a brake consists essentially of a loop of conductive wire arranged in a sleeve (18) closed by way of an insulating bush (20) of cylindrical form and having a longitudinal axis (16). The loop is in contact at least once with substantially all the generatrices of the inner wall of the bush (20). Preferably, the loop consists of a substantially straight first part (24) arranged parallel to the longitudinal axis (16) and a second part (26) wound helically round the first part (24) and connected to the latter.

7 Claims, 1 Drawing Sheet

WEAR INDICATOR FOR A FRICTION LINING

BACKGROUND OF THE INVENTION

The present invention relates to the wear indicators of the friction linings of a brake, especially a disk-brake, generally employed in motor vehicles. Very many types of such wear indicators are known. For example, the document FR-A-2,418,387 (corresponding to GB-A-2,015,099) describes a wear indicator consisting essentially of a loop of electrically conductive wire arranged in a sleeve in the form of a cylindrical insulating bush and having a longitudinal axis. The loop consists of a wire having two substantially straight parts which are parallel to the axis of the bush and which are connected together at one end.

The disadvantage of such an indicator is that it can only be arranged in such a way that its longitudinal axis is perpendicular to the wearing plane of the friction linings.

SUMMARY OF THE INVENTION

Now it is desirable to have the possibility of arranging the indicator in all the possible directions, especially with its axis parallel to the wearing plane. In this case, it is also necessary for the response of the indicator to be uniform, whatever its angular position. Finally, it is desirable that the indicator is extremely cheap and can be mass-produced.

The subject of the present invention is such a wear indicator.

According to the invention, the wire of the loop is in contact at least once with substantially all the generatrices of the inner wall of the bush.

The loop advantageously consists of a substantially straight first part arranged parallel to the longitudinal axis of the bush and of a second part wound helically round the first part.

BRIEF DESCRIPTION OF THE DRAWINGS

The invention will now be described by way of example with reference to the accompanying drawings in which.

DETAILED DESCRIPTION OF THE INVENTION

Figure 1:
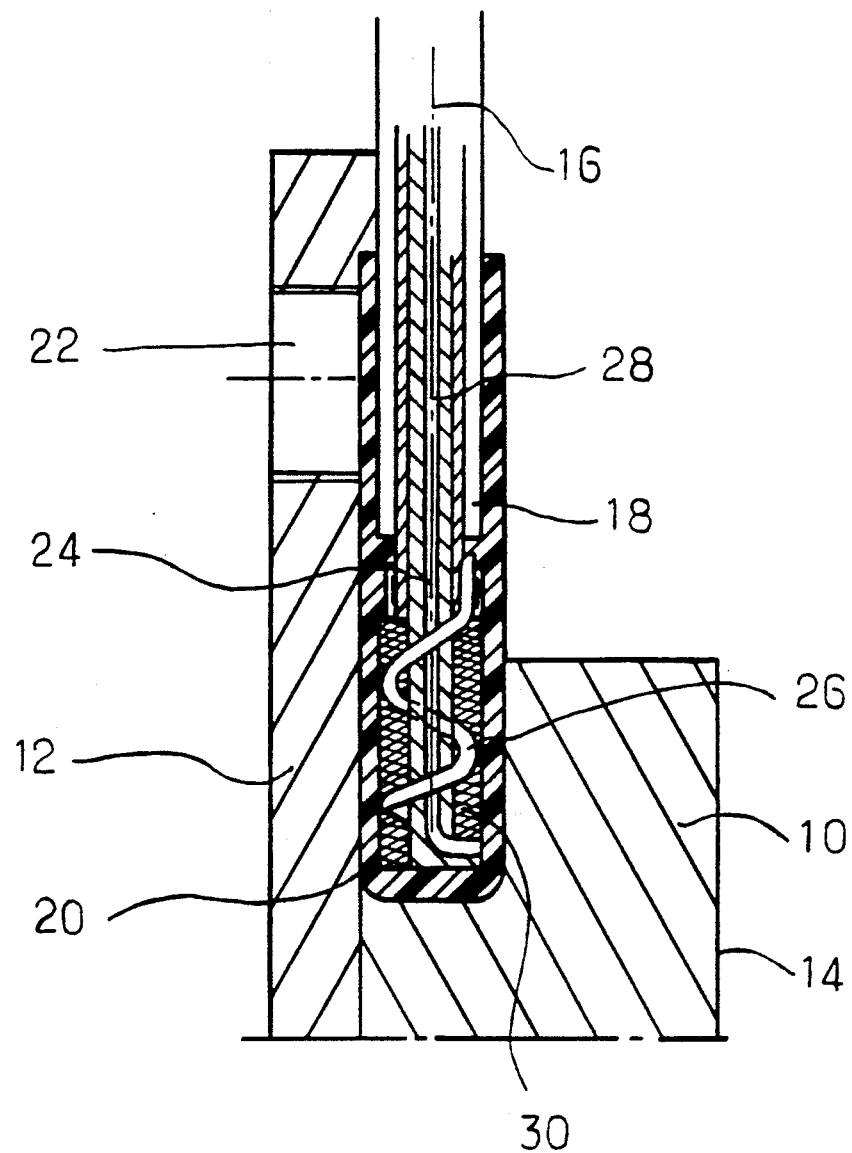
FIG. 1 shows diagrammatically, in section, a brake shoe equipped with a wear indicator according to the invention.

Referring now to FIG. 1, a brake shoe generally comprises a friction lining 10 adhesively bonded or fastened to a support 12. The friction lining 10 is capable of coming in contact with a disk (not shown) by means of its wall 14.

In the example illustrated, the longitudinal axis 16 of the indicator is parallel to the frictional plane defined by the wall 14.

The indicator comprises an insulating sleeve 18 closed by means of an insulating bush of cylindrical form 20 fastened to the support 12, for example by means of a centering stud 22 penetrating into an orifice provided for this purpose in the support 12. In the bush, a loop is formed by an electrically conductive wire. This loop consists of a substantially straight first part 24 arranged substantially parallel to the longitudinal axis 16 of the indicator and of a second part 26 in contact at least once with substantially all the generatrices of the inner wall of the bush. Thus, here, this second part 26 is wound helically round the first part 24. The two ends of the loop are connected in the conventional way either to a bifilar cable or to a coaxial cable 28, as shown.

In this case, the wire loop consists of the central core of the cable, the free end of which is connected to the outer braiding of the cable, after the loop has been formed.

To ensure that the indicator is rigid, especially when the bush 20 is in frictional contact with the disk, the space 30 left free in the bush 20 by the loop must be filled with a rigid material.

According to one embodiment, this space 30 can be filled by the injection of a thermosetting material, such as an elastomer or an adhesive, at a high temperature.

Figure 2:
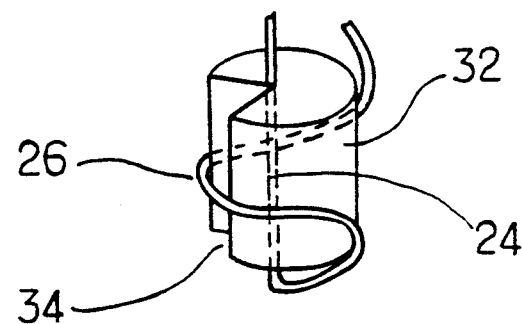
FIG. 2 diagrammatically, in perspective, a partial embodiment of an indicator according to the invention.

According to another embodiment, this space can be filled by means of a prefabricated anvil of a form substantially complementary to the inner part of the bush 20, as designated by the reference 32 in FIG. 2.

This anvil 32 therefore assumes a substantially cylindrical form of dimensions corresponding substantially to those of the bush.

A slot 34 is made longitudinally in the anvil 32 in order to receive the first part 24 of the wire, the second part 26 of which is wound round the anvil. The loop/anvil assembly is then force-fitted into the bush 20. A helical slot can likewise be provided on the anvil 32 for receiving the second part 26 of the wire.

This provides a wear indicator which can be arranged either parallel to or perpendicularly to the wearing plane of the friction lining 10 and which at all events has a uniform response to the wear.

Of course, such an indicator functions in a known way by the breaking of the loop.

Many modifications can be made by an average person skilled in the art, without departing from the scope of the invention, as defined by the accompanying claims.

For example, the above-mentioned bush can consist of a simple mold, into which the thermosetting material is injected, the mold subsequently being removed. There 10 is therefore no need for it to be physically present in the indicator, as it is used.

What we claim is:

1. A wear indicator of a friction lining of a brake, consisting essentially of a loop of conductive wire arranged in a sleeve closed by means of an insulating bush of cylindrical form and having a longitudinal axis, said loop being in contact at least once with substantially all the generatrices of an inner wall of said bush and said loop consisting of a substantially straight first part arranged parallel to said longitudinal axis and of a second part would helically around the first part and connected to said first part.

2. The indicator according to claim 1, wherein a space unoccupied in said bush by the loop is filled by the injection of a thermosetting material.

3. The indicator according to claim 2, wherein said material is an elastomer injected at a high temperature.

4. The indicator according to claim 1, wherein said straight first part is arranged in a longitudinal slot made in a cylindrical anvil having dimensions corresponding substantially to those of an inner part of said bush, the anvil located within the bush and said second part being wound helically around said anvil.

5. A wear indicator of a friction lining of a brake, consisting essentially of a loop of conductive wire arranged in a sleeve closed by means of an insulating bush of cylindrical form and having a longitudinal axis, said loop being in contact at least once with substantially all the generatrices of an inner wall of said bush, wherein said wire consists of a coaxial cable comprising a central core and a braiding, a free end of said central core being connected to said braiding.

6. The indicator according to claim 5, wherein a space unoccupied in said bush by the loop is filled by the injection of a thermosetting material.

7. The indicator according to claim 6, wherein said material is an elastomer injected at a high temperature.

* * * * *